US012775914B2

(12) United States Patent
Springer

(10) Patent No.: US 12,775,914 B2
(45) Date of Patent: Oct. 27, 2026

(54) INTELLIGENT NOTIFICATION OF MULTITASKING OPTIONS DURING A COMMUNICATION SESSION

(71) Applicant: Zoom Video Communications, Inc., San Jose, CA (US)

(72) Inventor: Shane Paul Springer, Manchester, MI (US)

(73) Assignee: Zoom Communications, Inc., San Jose, CA (US)

( * ) Notice: Subject to any disclaimer, the term of this patent is extended or adjusted under 35 U.S.C. 154(b) by 575 days.

(21) Appl. No.: 17/390,918

(22) Filed: Jul. 31, 2021

(65) Prior Publication Data

US 2023/0032434 A1 Feb. 2, 2023

(51) Int. Cl.
*G06Q 10/1093* (2023.01)
*G06N 5/02* (2023.01)
*G06N 20/00* (2019.01)

(52) U.S. Cl.
CPC ........... *G06Q 10/1093* (2013.01); *G06N 5/02* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,820,108 | B1 * | 11/2017 | Inciong | H04L 67/55 |
| 10,419,607 | B1 * | 9/2019 | Mossoba | H04M 3/5238 |
| 2018/0007099 | A1 * | 1/2018 | Ein-Gil | H04L 65/403 |
| 2018/0077097 | A1 * | 3/2018 | Alfaro | H04L 51/216 |
| 2019/0077097 | A1 * | 3/2019 | Takeno | B29C 70/443 |
| 2020/0293975 | A1 * | 9/2020 | Faulkner | G06Q 10/063114 |
| 2021/0075836 | A1 * | 3/2021 | Ein-Gil | G06F 9/468 |

(Continued)

FOREIGN PATENT DOCUMENTS

| | | | | |
|---|---|---|---|---|
| CN | 109416645 A | * | 3/2019 | G06F 9/468 |
| CN | 109714561 A | * | 5/2019 | |

(Continued)

OTHER PUBLICATIONS

Miranda-Correa, Juan Abdon, and Ioannis Patras. "A multi-task cascaded network for prediction of affect, personality, mood and social context using eeg signals." 2018 13th IEEE International Conference on Automatic Face & Gesture Recognition (FG 2018). IEEE, 2018. (Year: 2018).*

(Continued)

*Primary Examiner* — Thomas L Mansfield

(57) ABSTRACT

Methods and systems provide for intelligent notification of multitasking options during a communication session. The system receives information associated with a number of past requested events associated with a user of a communication platform, and a user behavioral profile associated with the user. The system receives notification of a requested event for the user. The system then deploys an AI model to analyze the user behavioral profile with respect to the requested event and the one or more past events, and generate, based on the analysis, prediction classification scores for one or more multitasking activities which can be performed by the user concurrently to attending the requested event. Finally, the system provides, based on the prediction classification scores, notification of at least a subset of the one or more multitasking activities which can be performed by the user concurrently to attending the requested event.

20 Claims, 6 Drawing Sheets

(56) References Cited

U.S. PATENT DOCUMENTS

| | | | | |
|---|---|---|---|---|
| 2021/0105332 | A1* | 4/2021 | Bellet | H04L 67/54 |
| 2021/0157978 | A1* | 5/2021 | Haramati | G06F 40/177 |
| 2021/0405743 | A1* | 12/2021 | Boesel | G06N 20/00 |

FOREIGN PATENT DOCUMENTS

| | | | | | |
|---|---|---|---|---|---|
| CN | 113852863 | A | * | 12/2021 | G06N 3/045 |
| EP | 2894572 | B1 | * | 8/2018 | G06F 15/7871 |
| WO | WO-2021071603 | A1 | * | 4/2021 | G06Q 10/10 |
| WO | WO-2021099839 | A1 | * | 5/2021 | G06F 40/177 |
| WO | WO-2022011357 | A1 | * | 1/2022 | G06F 16/2379 |

OTHER PUBLICATIONS

Crews, Derek E., and Molly J. Russ. "The impact of individual differences on multitasking ability." International Journal of Productivity and Performance Management 69.6 (2020): 1301-1319. (Year: 2020).*

Lin, Trisha TC. "Why do people watch multiscreen videos and use dual screening? Investigating users' polychronicity, media multitasking motivation, and media repertoire." International Journal of Human-Computer Interaction 35.18 (2019): 1672-1680. (Year: 2019).*

Robal, Tarmo, et al. "IntelliEye: enhancing MOOC learners' video watching experience through real-time attention tracking." Proceedings of the 29th on Hypertext and Social Media. 2018. 106-114. (Year: 2018).*

Holmes, Mike, et al. "Near real-time comprehension classification with artificial neural networks: Decoding e-learner non-verbal behavior." IEEE Transactions on Learning Technologies 11.1 (2017): 5-12. (Year: 2017).*

* cited by examiner

INTELLIGENT NOTIFICATION OF MULTITASKING OPTIONS DURING A COMMUNICATION SESSION

FIELD OF INVENTION

The present invention relates generally to digital communication, and more particularly, to systems and methods for providing intelligent notification of multitasking options during a communication session.

BACKGROUND

Digital communication tools and platforms have been essential in providing the ability for people and organizations to communicate and collaborate remotely, e.g., over the internet. In particular, there has been massive adopted use of communication platforms allowing for remote video sessions between multiple participants. Communications applications for casual friendly conversation ("chat"), webinars, large group meetings, work meetings or gatherings, asynchronous work or personal conversation, and more have exploded in popularity.

With the ubiquity and pervasiveness of remote video conversations, users of such communication platforms frequently find themselves in back-to-back scheduled events throughout the day, e.g., meetings, virtual gatherings of coworkers, and other events. Some users may have remote work meetings or other commitments booked constantly during work hours for a week or even several weeks in advance. Some may even have work meetings or events scheduled for non-work, personal hours. In the event of a user of such a platform being invited to so many meetings, there may be a feeling that the user must dedicate full attention to each one, preventing the user from partaking in other desired or beneficial activities. For example, a user may feel that due to such a schedule, he has no available time for exercise, reading, a walk in a nearby park, or cooking a meal.

Some users may decide that it may be possible to perform such activities during events they attend. For example, a user may decide to go for a walk outside while listening to audio from a meeting via their smartphone, and may also be able to participate by speaking during the meeting. However, it is not always clear whether a given requested event is one that enables a particular activity to be performed while the event takes place. For example, the same user may not want to go for a walk outside if a particular meeting requires that user to view another user's desktop and carefully analyze data on it, or requires that user to share their own desktop screen or window and present material on it.

In addition, determining which activities a user can likely perform during a given event may not always be an easy issue to solve. Whether a user can perform other activities during an event depends on whether that specific user is likely to contribute at the event and in what manner, whether they are likely to view a screen or share a screen, the importance of other attending or hosting users to that user within an organization, what intensities of activity levels the user is capable of undertaking while multitasking, and much more. Such a determination is unique to the user and their behaviors and preferences, as demonstrated from, e.g., past meetings, stated preferences, and more.

Thus, there is a need in the field of digital communication tools and platforms to create a new and useful system and method for providing intelligent notification of multitasking options during a communication session. The source of the problem, as discovered by the inventors, is a lack of ability to accurately predict a set of determined multitasking activities which the user is likely to be able to perform during a given event, unique to that user's behaviors and preferences.

SUMMARY

The invention overcomes the existing problems by providing intelligent notification of multitasking options during a communication session for a user, based on that user's behaviors and preferences. In some embodiments, such notifications can be provided based on an artificial intelligence (AI) model (e.g., a predictive or machine-learning based model) and information received from the communication platform which can be used to provide insight into the determination. For example, such information may include whether the meeting is a regularly scheduled, recurring meeting, and whether the user has historically been muted (i.e., disabled their audio feed) in past recurring sessions and never participated in them. Other examples of factors may include that no one in past recurring meetings has shared their screen, and whether a user has chosen to join the meeting only sometimes. More such factors and considerations in the determination will be explored throughout.

In one embodiment, the system receives information associated with a number of past requested events associated with a user of a communication platform, and a user behavioral profile associated with the user which includes a number of user behaviors associated with the requested events. The system receives notification of a requested event for the user. The system then deploys an AI model to analyze the user behavioral profile with respect to the requested event and the one or more past events, and generate, based on the analysis, prediction classification scores for one or more multitasking activities which can be performed by the user concurrently to attending the requested event. Finally, the system provides, based on the prediction classification scores, notification of at least a subset of the one or more multitasking activities which can be performed by the user concurrently to attending the requested event.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for dynamic alteration of notification preferences within a communication platform.

The present disclosure will become better understood from the detailed description and the drawings, wherein.

DETAILED DESCRIPTION

Figure 1A:
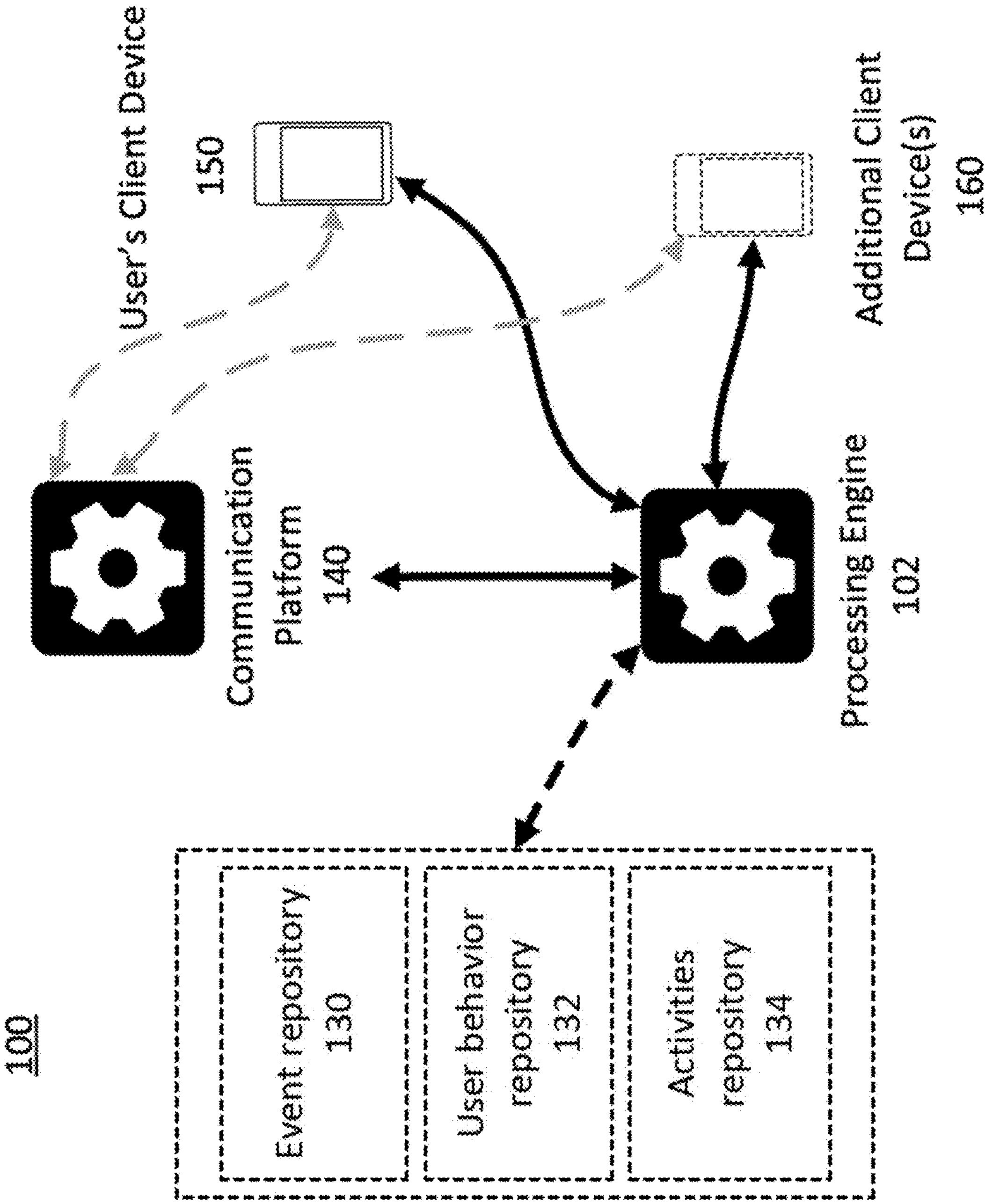
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

By way of illustration of the systems and methods described herein, John has a meeting scheduled for Tuesday at 2 μm. It is a recurring meeting which he typically half-listens to. While he finds that important information is sometimes presented, he never participates and stays on mute throughout, and the meeting is hosted by a different department from his own. The communication platform sends him a notification prior to the meeting that he can likely take the meeting while walking or exercising, which are two activities John has indicated that he desires for multitasking during scheduled events in his calendar. He steps out the door with his phone and headphones, and is able to have a brisk walk around his neighborhood park while taking the meeting.

I. Exemplary Environments

FIG. 1A is a diagram illustrating an exemplary environment in which some embodiments may operate. In the exemplary environment 100, a user's client device 150 and one or more additional client device(s) 160 are connected to a processing engine 102 and, optionally, a communication platform 140. The processing engine 102 is connected to the communication platform 140, and optionally connected to one or more repositories and/or databases, including, e.g., an event repository 130, user behavior repository 132, and/or an activities repository 134. One or more of the databases may be combined or split into multiple databases. The user's client device 150 and additional client device(s) 160 in this environment may be computers, and the communication platform 140 and processing engine 102 may be applications or software hosted on a computer or multiple computers which are communicatively coupled via remote server or locally.

The exemplary environment 100 is illustrated with only one additional user's client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
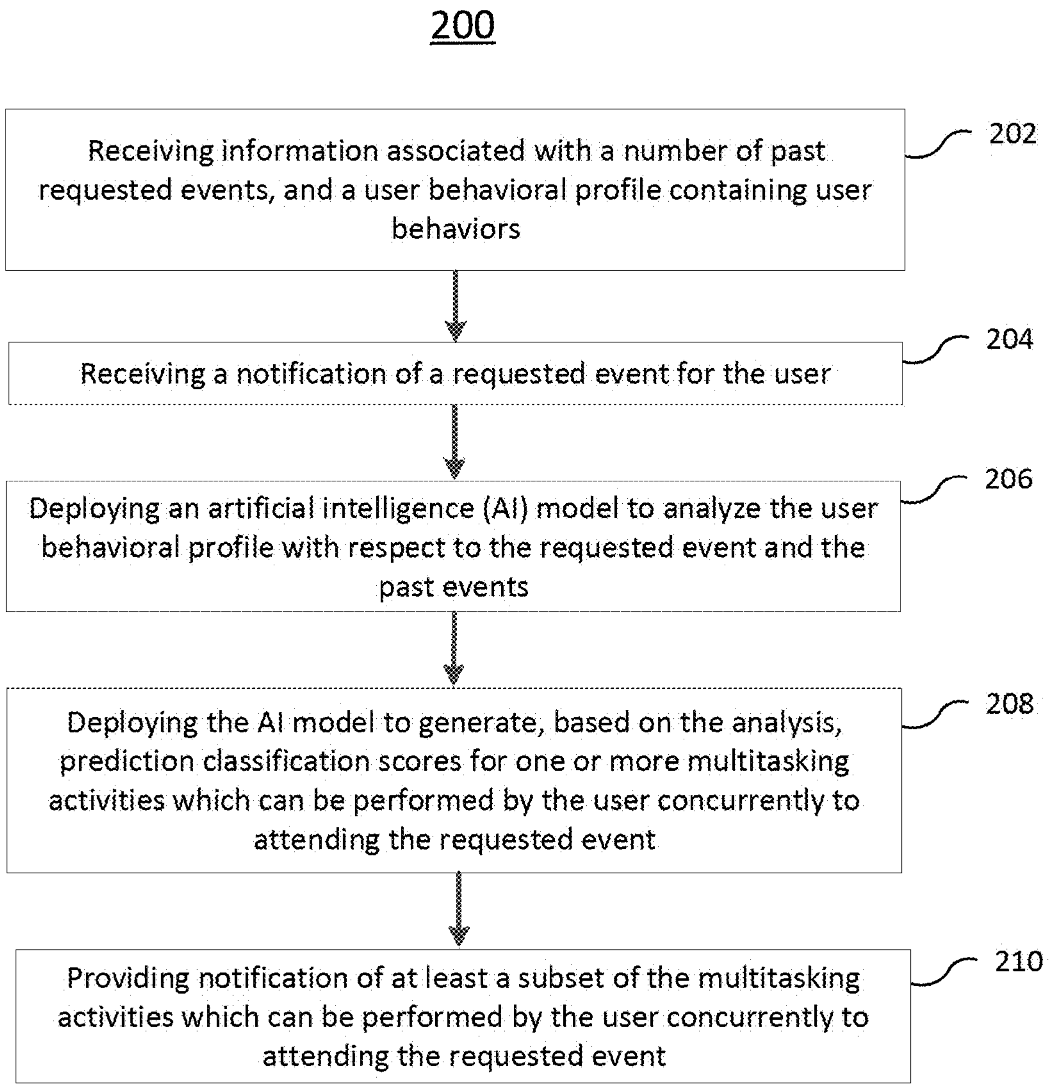
FIG. 2 is a flow chart illustrating an exemplary method that may be performed in some embodiments.

In an embodiment, the processing engine 102 may perform the exemplary method of FIG. 2 or other method herein and, as a result, provide for intelligent notification of multitasking options during a communication session. In some embodiments, this may be accomplished via communication with the user's client device, additional client device(s), processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The user's client device 150 and additional client device(s) 160 are devices with a display configured to present information to a user of the device. In some embodiments, the client devices present information in the form of a user interface (UI) with multiple selectable UI elements or components. In some embodiments, the client devices 150 and 160 are configured to send and receive signals and/or information to the processing engine 102 and/or communication platform 140. In some embodiments, the client devices are computing devices capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client devices 150 and/or 160. In some embodiments, one or more of the communication platform 140, processing engine 102, and client devices 150 and 160 may be the same device. In some embodiments, the user's client device 150 is associated with a first user account within a communication platform, and the additional client device(s) 160 are associated with additional user account(s) within a communication platform.

In some embodiments, optional repositories can include one or more of an event repository 130, user behavior repository 132, and/or activities repository 134. The optional repositories function to store and/or maintain, respectively, one or more future events and past events associated with a user of the communication platform 140 (and, in some embodiments, calendar information associated with the user and/or additional users); user behaviors and/or preferences detected or identified for a user within the communication platform; and multitasking activities which can be included within notifications about multitasking, including a prediction classification score for each. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, video conference or meeting, message board or forum, virtual meeting, or other form of digital communication. The communication session may be one-to-many (e.g., a speaker presenting to multiple attendees), one-to-one (e.g., two friends speaking with one another), or many-to-many (e.g., multiple participants speaking with each other in a group video setting).

Figure 1B:
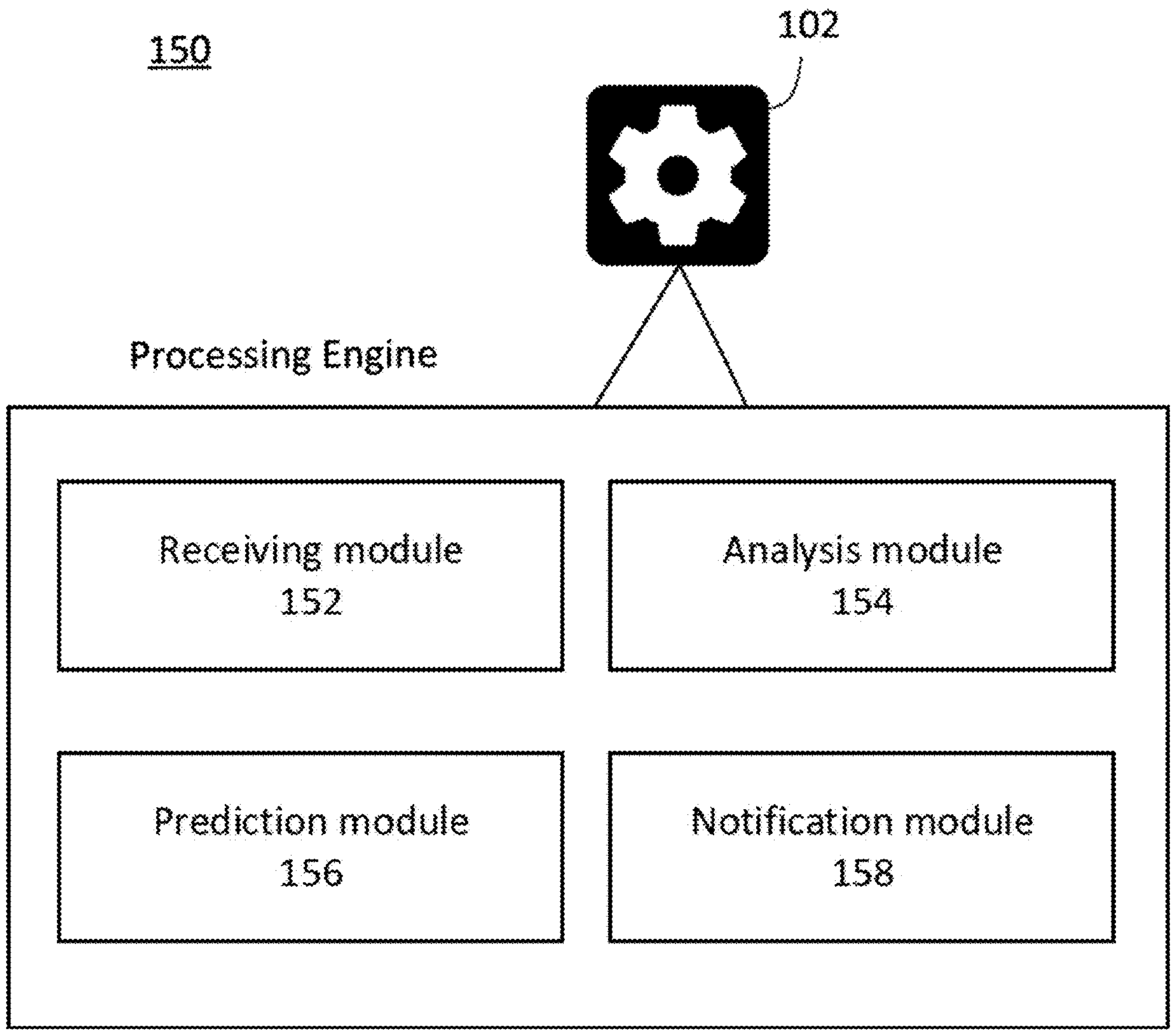
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Receiving module 152 functions to receive or maintain information associated with a number of past requested events associated with a user of a communication platform, and a user behavioral profile associated with the user. The receiving module 152 also functions to receive a notification of a requested event for the user, which may be an event the user has scheduled to attend or has not yet scheduled to attend.

Analysis module 154 functions to analyze the user behavioral profile with respect to the requested event and the one or more past events.

Prediction module 156 functions to provide a prediction classification score for one or more multitasking activities which can be performed by the user concurrently to attending the requested event, based on the analysis.

Notification module 158 functions to provide, based on the prediction classification scores, notification of at least a subset of the one or more multitasking activities.

The above modules and their functions will be described in further detail in relation to an exemplary method below.

II. Exemplary Method

FIG. 2 is a flow chart illustrating an exemplary method that may be performed in some embodiments.

At step 202, the system receives information associated with a number of past requested events associated with a user of a communication platform, and a user behavioral profile associated with the user consisting of a number of user behaviors associated with the past requested events.

In various embodiments, an event may constitute one or more of any communications which can occur on a communication platform. For example, an event may be, e.g., a meeting between two people, a meeting between many people, a chat message, a chat session, synchronous or asynchronous communications, administrative communications, a document collaboration session, or any other suitable communications on a communications platform. In some embodiments, only, e.g., meetings may qualify as events, while in others, only chat messages may constitute events. Many such combinations and possibilities can be contemplated. An event may be a past requested event when it has previously been requested for the user to attend by another user of the platform or a host associated with the event. In some cases, a past requested event may have been accepted or declined by the user, and attended or not attended by the user, with varying possible levels of participation and/or engagement if the user attended the event.

In some embodiments, the system receives a calendar associated with a user of a communication platform, where the calendar includes the one or more past requested events and a currently requested event (as will be described further below). In some embodiments, the calendar associated with the user is a calendar internal to the communication platform. In other embodiments, the calendar is external to the communication platform, and may be developed and/or maintained by a third party. In some embodiments, the communication platform integrates the calendar functionality into the platform, and/or connects to the calendar via a remote network or cloud solution. In yet other embodiments, events may be completely separate conceptually from a calendar, including being separate from meetings or other events scheduled within a calendar.

In some embodiments including a calendar, the calendar includes a list of dates associated with information about events scheduled for particular dates, e.g., time and length of event, name of event, participants, link to the communication platform session for holding the event, and any other suitable information for an event on a communication platform that has been scheduled. In some embodiments, the calendar includes one or more personal events in addition to the one or more work events. In some embodiments, multiple calendars for the user may be received and used within the system, including, e.g., one work calendar and one personal calendar for the user. In some embodiments, a single calendar may include both personal events and work events.

In some embodiments, the calendar includes information on events, including past requested events and currently requested events. In varying embodiments, such information may include one or more of, e.g., names of events, participants of events, whether the user in question accepted, attended, participated in, or was engaged in past requested events (as will be described in further detail below), dates and times for events, and any other suitable information about events which may be relevant. In some embodiments, the information includes information about notifications for those events, including whether a user altered notification preferences about the event, ignored the notifications or opted to close the notification without viewing it, or engaged with the notification by viewing it.

In some embodiments, a notification associated with an event may be any form of notification received on a user device, such as, e.g., a push notification on a smartphone, a notification received and displayed within a desktop interface of a computer, a text message, an audio cue or activation of vibration within a user device, lights flashing on the device or a screen of the device being activated from a sleep mode, or any other suitable notification. An example of a notification received on a user device is illustrated with respect to FIG. 3, which will be described in further detail below.

In some embodiments, the user behavioral profile contains user behaviors which have been associated with the user regarding historical behaviors and preferences in relation to notifications and past events. In some embodiments, these user behaviors and preferences are detected by the system, generated, and stored in the user behavioral profile. In other behaviors, the user behaviors can be retrieved from one or more other locations, such as data received from the user device about notification behavior, or from the user themselves via one or more UI mechanisms for sharing user behaviors and preferences with the system. In some embodiments, the user behaviors constitute insights about how the user behaves, and their habits and predilections in relation to notifications for a myriad of activities within the communication platform as well as various times throughout the day and other factors.

In some embodiments, at least a subset of the user behaviors associated with past requested events relates to how users behaved with respect to past events and/or notifications about past events, including how important the past events were to the user (including, e.g., whether the user attended the event, participated in the event, was engaged with the event, etc.). In some embodiments, whether the user accepted or declined an event upon receiving an event invite is relevant information in terms of whether the user considers the event to be important enough to attend. If the user declined an event, the system may determine one or more user behaviors representing common factors or patterns in meetings the user declines. For example, a user may decline events with 200 participants or more, but accept events with 50 or fewer participants, which creates a pattern which can be used to predict that a user will be likely to want to receive a notification about similar events.

In some embodiments, at least a subset of the user behaviors associated with past requested events relates to attending or not attending the past requested events that have been accepted. In some cases, users may accept an event invitation, but then not attend that event. User behaviors may be generated containing some predilections of the user for what sorts of events the user is likely to accept but not attend. For example, a user may always accept events for a weekly social hour, but may only be able to attend the social hour 10% of the time. The user behavior generated may thus reflect this likelihood of the user wanting a notification about that event. In another example, the user may attend 100% of events within their own team, but may accept but not attend 100% of events outside of their own team. This is also a user behavior which may be determined and generated.

In some embodiments, at least a subset of the user behaviors associated with past requested events relates to the user participating or not participating in the past requested events that were attended by the user. In various embodiments, participating can include one or more of, e.g., contributing vocally to the event, displaying a video feed, screen sharing, document collaboration, and textual messaging within the event interface. Such user behaviors may be relevant because even though a user may accept an event invitation and even attend the event in question, the user may still not participate in the event, and may choose to disable both their audio and video broadcasting throughout the full duration of the event. The likelihood of the user not wanting to receive a notification for that event may increase if the user typically does not participate in similar events.

In some embodiments, at least a subset of the user behaviors associated with past requested events relates to one or more multitasking activities the user was engaged in while attending the event. For example, if the system has information that the user was walking during the event (for example, listening with headphones to a speaker in the session while walking somewhere), then a user behavior may be associated with that multitasking activity. In some embodiments, the system may detect one or more multitasking activities via the user's client device, or may receive information about the multitasking activity submitted by the user or otherwise received by the system.

In some embodiments, at least a subset of the user behaviors associated with past requested events relates to user engagement within the past requested events that were attended by the user. In various embodiments, user engagement can include one or more of, e.g., visual engagement via eye tracking, whether the event is within an active window of the user environment, and percentage of the event attended. Engagement when attending an event is often a good indicator of how important or not important the user considers the event to be. For example, a user may be fully engaged during events with his supervisor, and this manifests as always having the event window as the dominant active window within the user's browser of communication application, expanding the window to better view shared material, having their eyes track aspects of the event (thus demonstrating a focused attention on the event), and more. Conversely, if the user is attending a 250-person event for a department other than the user's own which the user is not interested in engaging with, the user behaviors for that event may include, e.g., having the window minimized or not visible on the user's screen, leaving the event early (e.g., 50% of the way through the duration of the event when other participants remain for the full duration), participating in asynchronous chat or conversation within the communication session, clicking on different elements within the communication session window, and more.

In some embodiments, at least a subset of the user behaviors associated with past requested events relates to a likelihood the user will attend an event with one or more specific additional users. In some embodiments, the one or more specific additional users are users within a particular hierarchy or subhierarchy of an organization. A user will be more likely to consider a notification about an event important if their direct supervisor attends the event, for example, or if one of the colleagues they work closely with daily is hosting an event. In some embodiments, the system can receive hierarchical, sub-hierarchical, or other organizational information with respect to a user of the communication platform, and use this information to determine new user behaviors for users with respect to events within that organizational hierarchy.

For example, a user may be part of a premium business account within the communication platform that includes all employees of the organization. The organization provides information to the communication platform about the organizational hierarchy of that organization, includes names of users and their place within the hierarchy. The system can then use this information to determine relevant insights about user behavior. In some embodiments, the system may determine that the closer a user is to another user within the organizational structure, the more likely they will be to want to receive notifications about events with that user.

In some embodiments, at least a subset of the user behaviors associated with the past requested events relate to recurring events. Such recurring scheduled events can lead to important insights about user behavior with respect to that set of recurring events as well as other types of recurring events which may share similar qualities (e.g., same or similar participants, same departments, same subject matter, etc.) One example of a user behavior may be that a user has accepted all future recurring events for a particular weekly event, but never attends the events, or is never engaged nor participating within the event. In such a case, it is more likely that the user does not want to receive a notification about that event in a given time. Another example may be that the user has often or always performed a particular multitasking activity while attending the recurring event. For example, a user may have a routine of using an exercise bike during a certain weekly recurring meeting, or washing dishes. Such a routine may indicate that the user will most likely want to perform the same multitasking activity at future meetings in the recurring series of meetings. User behaviors may be present within the user behavioral profile to reflect this.

In some embodiments, at least a subset of the user behaviors relates to notification rules for the user. In some embodiments, the system receives or generation notification rules for the user, and then adds those notification rules to the user behavioral profile to be included in the analysis of the user behavior profile for prediction purposes. Notification rules may relate to one or more protocols with respect to altering notification preferences. In some embodiments, notification rules may take some conditional form. For example, a notification rule may stipulate that if the user is at dinner, defined as between 6-7:30 PM every day, all notifications are to be disabled. More complex notification rules can be received or generated. In some embodiments, users may be able to configure or generate their own notification rules within a preferences interface. In some embodiments, the system may periodically provide one or more recommendations of notification rules to the user. For example, upon a notification preference being altered, the decision may be placed within an altered notifications digest which is periodically presented to the user, or presented within a preferences interface. The recommendation about that decision can be presented to them, and a notification rule can be generated if the user indicates it should be generated.

In some embodiments, the system provides, to the user, recommendations of one or more notification rules for the user, then receives confirmation or rejection from the user to add at least a subset of the notification rules to the user behavioral profile. If a confirmation is received, the system adds the notification rules to the user behavioral profile to be included in the analysis of the user behavioral profile. In some embodiments, the system can additionally feed the confirmation or rejection from the user back into the AI model to improve generation of future prediction scores. This may be achieved by, e.g., reinforcement learning, closed-circuit reward-based feedback circuits, or any other suitable technique.

In some embodiments, device telemetry can be used to determine one or more multitasking activities that the user is engaging with on the phone or other client device the user may be carrying or using, which can be added to user behaviors and added to the analysis of whether to alter notifications preferences. For example, a user may be walking, running, taking a picture, on a phone call with someone, working on a document, reading emails, or performing some other activity. The phone may also indicate that the user is in motion. If the user is currently walking somewhere or engaged in exercise, the notification preferences may be more likely to be altered to take note of the multitasking activity in the notification, and provide information on whether the user can most likely continue to engage in the multitasking activity during an upcoming meeting that is about to take place.

At step 204, the system receives a notification of a requested event for the user. In varying embodiments, the requested event may be sent from, e.g., a scheduling application, a calendar application (such as an integrated calendar, as described above), an internal event scheduler or handler within the communication platform, or any other suitable application or source for receiving notifications about requested events. The requested event may be considered a current requested event or future requested event. In some embodiments, the user may not have yet responded to the requested event.

At step 206, the system deploys an artificial intelligence ("AI") model to analyze the user behavioral profile with respect to the requested event and the past events.

Figure 4:
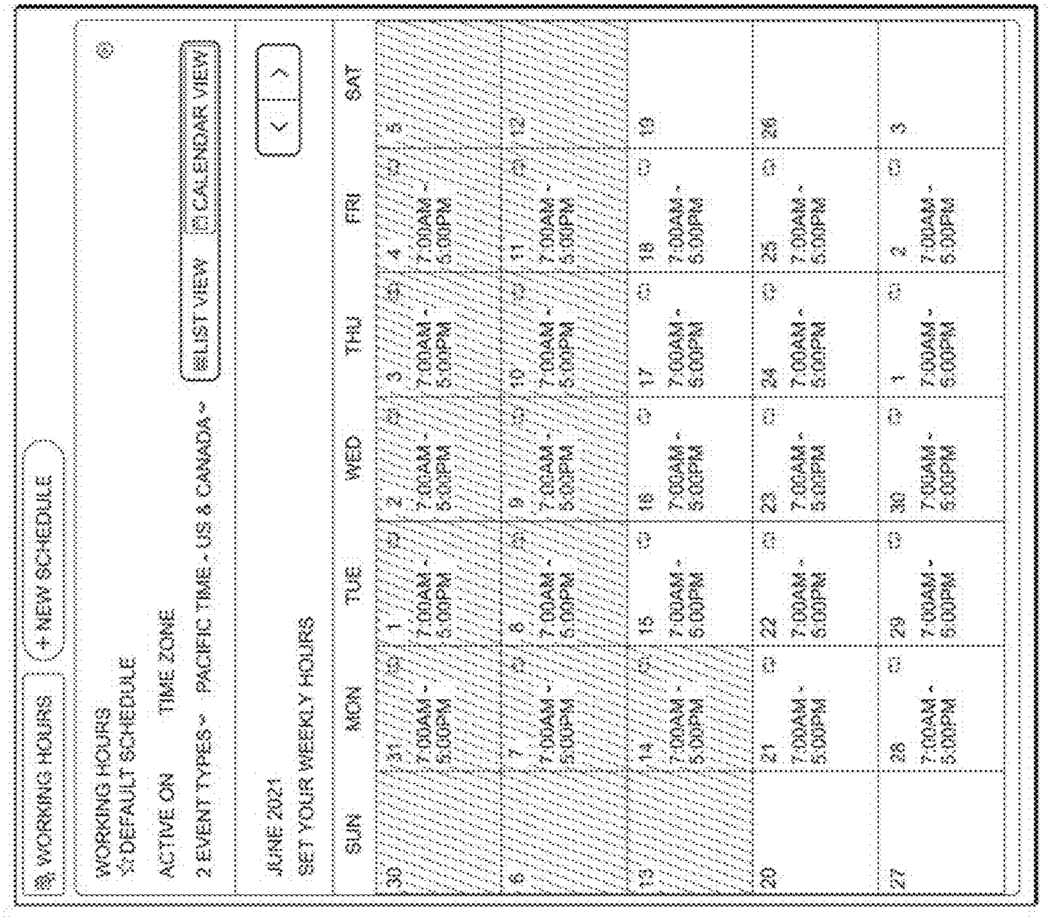
FIG. 4 is a diagram illustrating one example embodiment of a UI for setting desired working hours within a communication platform, according to some embodiments.

In some embodiments, users can specify desired working hours or acceptable times for receiving notifications. The system will take such times into account when determining whether to alter notifications preferences. One example of a user interface for establishing or configuring desired working hours is illustrated in FIG. 4, which will be described in detail further below.

In some embodiments, the importance of the notification time, or time block in which the notification time occurs, can be taken into account when determining whether to alter notification preferences. In various embodiments, the importance of the current time block can be influenced by one or more of: desired working hours; if the user has historically interacted during that time block with notifications; if the event is a specific type of event the user has considered to be important, based on past behavior; if the user has an "out of office" flag set up during the time block (which would have a higher priority than a generic meeting); or any other suitable factors for a time block to be considered important.

In some embodiments, the deployed AI model may include AI-based processes and techniques, such as, e.g., machine learning or deep learning. In some embodiments, the AI model utilizes neural networks, such as, e.g., convolutional neural networks ("CNNs"), recurrent neural networks ("RNNs") long short term memory ("LSTM"), and deep neural networks ("DNNs"). In some embodiments, the AI model can be trained on datasets relating to users, past events, previous notifications, previous AI-generated predictions relating to altering notification preferences, and more. In some embodiments, the AI model is trained on at least one or more datasets comprising user behavioral profiles for users of the communication platform with respect to notifications for past events.

In some embodiments, the AI model is trained to classify or predict values relating to user behaviors from the user behavioral profile as well as the past requested events. If a user behaved in a certain way with respect to notifications for past events that are similar to the requested event the notification is about, then the user is likely to behave in similar ways with respect to the requested event in question. For example, if events hosted by a certain department are always accepted but never attended, then there is a high likelihood that the event in question, which is also hosted by the department and was accepted by the user, will also not be attended. The system analyzes the user behavioral profile and similar past requested events to generate such connections and/or likelihood values between past events and the event in question.

At step 208, the system deploys the AI model to generate, based on the analysis, a prediction classification scores for one or more multitasking activities which can be performed by the user concurrently to attending the requested event. In varying embodiments, the multitasking activities may be generated or received from, e.g., a list of predefined multitasking activities within the system, a list of multitasking activities selected for the user based on the user behavioral profile, may be dynamically determined based on the requested event, past requested events that are similar, user behaviors, and/or other pieces of information.

The prediction classification scores each function as a confidence score with regard to how likely it is that the user will be able to comfortably perform the multitasking activity while attending the event and being engaged at the event to the extent the user wishes or is expected to be engaged. The analysis from step 206 is used to generate the prediction classification scores based on whether similar past requested events had previous behaviors associated with them that point toward the user willing to or being able to perform certain multitasking activities while attending the requested event (e.g., the user performed the same or similar multitasking activities during past similar events, the user attended or didn't attend past similar events, the user participated or didn't participate in past similar events, the user was engaged during the previous events or not, etc.) as well as the user's behaviors with respect to notifications for that event (ignored, closed without viewing, viewed, etc.) As mentioned above, in some embodiments, the prediction classification scores are generated via an AI model which the system deploys. In some embodiments, a consistent system or metric is employed by the AI model such that prediction scores are all generated with the same metrics, and can be readily compared to one another or ranked for various purposes.

In some embodiments, the system includes a multitasking activity within a notification if the prediction classification score meets or exceeds a multitasking threshold.

In some embodiments, a multitasking threshold may be a predefined, pre-established threshold for identifying within the system whether the prediction classification score is high enough for the system to predict that the user would be able and willing to perform the activity during the requested event. In some embodiments, determining that the prediction classification score for the notification meets or exceeds a multitasking threshold involves determining whether the user's expected or predicted participation or engagement during the event, as determined based on similar past requested events, allows for the multitasking activity in question to be performed. In some embodiments, rather than the multitasking threshold being a predefined or pre-established threshold, it is dynamically determined based on one or more factors, with different users potentially having different multitasking thresholds based on, e.g., user behaviors, user-specific multitasking abilities, third-party data from one or more integrated applications such as a health tracking application, organizational title or hierarchical position, department, or other relevant factors.

In some embodiments, the AI model is deployed in real time or substantially real time, at the moment of, or just prior to the notification time for that requested event. Thus, the AI model can factor in what the user is currently engaged in on the device or whether an event is currently being held that the user is participating in, or other suitable events that the user is engaged in at that precise moment.

At step 210, the system provides notification of at least a subset of the multitasking activities which can be performed by the user concurrently to attending the requested event. The notification can be provided via, e.g., a push notification or other notification to a smartphone, tablet, computer, or other client device of the user, an email, a text message, a calendar reminder, a message within a messaging system of the communication platform, a user interface element within the communication platform, or any other suitable form of providing a notification to the user.

In some embodiments, the system receives or generates an intensity level for each of at least a subset of the desired multitasking activities. Intensity levels may refer to, e.g., the extent of exertion, engagement, or mental or physical energy and exertion may be required to undertake a task relative to other tasks. For example, running may be determined to have a higher intensity level than walking, and may involve use of both hands and legs such that a user may not be able to focus on a detailed spreadsheet shared during a work meeting. Walking, in comparison, may potentially allow the user to engage at least partly in viewing the spreadsheet during the activity. In some embodiments, the intensity levels for the desired multitasking activities are added to the user behaviors associated with the desired multitasking activities, and the multitasking activities are provided within the notification in descending order of intensity level. In some embodiments, intensity levels may be determined dynamically based on one or more user behaviors related to the user, such that each user may have different intensity levels for activities based on information the system has about that user engaging in that activity in the past.

In some embodiments, the system assigns a priority level to at least a subset of the multitasking activities, and the multitasking activities are provided within the notification in descending order of priority. The priority level refers to an assigned importance of the activity to be completed or engaged in for the user. In some embodiments, the priority level is assigned based on one or more instructions or preferences communicated by the user within the communication platform regarding activities. In some embodiments, the priority level is dynamically assigned based on user behaviors, past requested events which are similar to the requested event, and/or other information within the system.

In some embodiments, the system determines that at least one of the subset of multitasking activities represents a completed activity which the user has completed within a predefined time window, and the system assigns a lower priority level to the completed activity than other activities which are not yet completed. For example, if a user has just recently completed exercising within the past hour, the system assigns all exercise-related multitasking activities a low score relative to other multitasking activities. This ensures that the user is not presented with a notification about exercising activities which can be performed when the user has already recently exercised.

In some embodiments, the system provides, to the user via the user client device, a decision digest including one or more decisions made with respect to including or not including multitasking activities in recent notifications about requested events. Thus, a user can quickly see at a glance what decisions for including or not including multitasking activities for notifications were made. In some embodiments, the user can quickly select an option to agree or disagree with the decisions to include or not include multitasking activities, and can opt to have those same multitasking activities included or not included in the future for similar events. Thus, the user can be empowered to make decisions regarding being informed of multitasking possibilities for events within an easy, consolidated format. In some embodiments, the digest may be configured either by default or by the user to be presented to the user daily, weekly, monthly, or at any other interval. In some embodiments, the user must go to a preferences interface in order to view the decision digest.

In some embodiments, the decision digest further includes one or more reasons for why multitasking activities were included or not included in notifications for requested events. In some embodiments, there may be a message associated with each alteration decision. For example, a message may read, "we included running as a multitasking activity for this requested event at this time block because you stated that 5-6 μm is your usual time for running during weekdays, and because you've attended previous events in this recurring series while running." In some embodiments, the user can configure one or more decisions to be recurring decisions, i.e., can select decisions to be made again in future similar circumstances.

In some embodiments, the system provides, to an administrator or manager of the user within an organization, anonymized and aggregated data on the user and a number of other users within the organization with respect to multitasking activities performed by the users during requested events. In some embodiments, this anonymized and aggregated data includes activity or engagement levels of the user and the plurality of other users during the requested events while multitasking. Thus, for example, a manager within an organization may be able to learn that 60% of employees exercised during meetings, and these employees were determined to be only 3% less active in that meeting in terms of participation and/or engagement metrics (e.g., viewing documents, speaking, listening to audio, watching video feeds, and/or any other relevant forms of participation and/or engagement). This allows administrators and managers to learn whether employees are still able to participate and engage in meetings despite engaging in multitasking activities, and make informed decisions about multitasking during meetings based on this information.

In some embodiments, upon the user attending the requested event, the system can be configured to detect one or more activities the user is engaged in via a user device (such as, e.g., the user's client device, a fitness tracker, or other suitable device) connected to the communication platform to confirm or deny that at least one of the multitasking activities is being performed by the user during the requested event. For example, a fitness tracker the user is wearing may send information about activities the user is engaged in or level of physical activity being performed by the user during the meeting being attended. The system may then be able to use this information to confirm or deny that the user is, in fact, engaged in a multitasking activity, and may be able to identify or predict which activity the user is engaged in. In some embodiments, the system can then feed this confirmation or denial back into the AI model to improve the generation of future prediction classification scores for that user, and/or potentially for other users. In some embodiments, the provide notification about the requested event may relate to multitasking activities that the system has detected the user is currently engaged in. For example, if a user is engaged in exercise 15 minutes prior to an event starting, a notification may inform the user that they may be able to continue exercising during the meeting. The user can then continue to exercise while attending the meeting, without a pause in the activity.

In some embodiments, for each multitasking activity, the system can receive confirmation or denial from the user to add the multitasking activity to a list of multitasking activities for the user to be notified of for similar events. In some embodiments, the system can then feed the confirmation or denial from the user back into the AI model to improve the generation of future prediction classification scores. In this way, the user can ensure that desired multitasking activities are continually recommended in future events that are similar to the requested event, and the system can improve the prediction based on indication of the user on whether listed multitasking activities were desired by the user.

Figure 3:
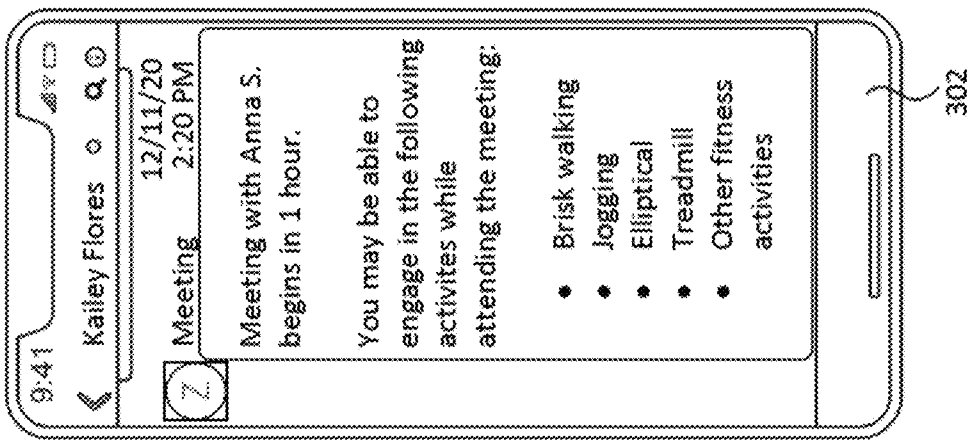
FIG. 3 is a diagram illustrating one example embodiment of a notification for a communication platform displayed on a user device, according to some embodiments.

FIG. 3 is a diagram illustrating one example embodiment of a notification for a communication platform displayed on a user device, according to some embodiments. User device 302 shows a messaging application on a user's smartphone with a single notification on it. In varying embodiments, the messaging application may be internal to the communication platform or external to it. The notification originates from, and was generated by, a communication application, and the notification is in the form of a push notification on a messaging screen or window of the user's smartphone. The notification was sent at 2:20 PM, and informs the user of the user device about a meeting with Anna S. which begins in 1 hour from the time of notification. The notification additionally informs the user that they may be able to engage in a number of multitasking activities while attending the meeting, including brisk walking, jogging, elliptical, treadmill, and other fitness activities. The multitasking activities that are listed, if any, are determined by the steps of FIG. 2, including the analysis of the user behavioral profile with respect to the requested event and past events, and the generation of prediction classification scores for one or more multitasking activities which can be performed by the user concurrently to attending the requested event. In some embodiments, depending on the settings and functions of the user device, the notification may be accompanied by an audio cue, vibration from the device, a lighting up of the device or activation of the screen from sleep mode, or some combination thereof.

In some embodiments, the user may not receive such a notification, or may receive a notification but not receive a list of multitasking activities which can be performed, for a number of possible reasons. In one example, the user may not receive such a notification or listed activities if based on the systems and methods described here, the system predicts that the user would not be able to multitask during this meeting based on predicted required or desired engagement levels for this event. For example, the user may be presenting on a topic and must be highly engaged during the meeting, and needs his full focus directed to the presentation. The user may also be attending an important organizational meeting where special focus will be required or desired, or may be attending a one-on-one meeting with the user's direct superior and does not want to multitask to stay as engaged as possible.

FIG. 4 is a diagram illustrating one example embodiment of a UI for setting desired working hours within a communication platform, according to some embodiments. Within the UI, a user associated with a calendar can opt to configure the calendar such that certain designated working hours or desired hours can be set. In some embodiments, these hours can be set on a weekly or, potentially, daily basis. These working hours designate time ranges for which the user is, in various embodiments or preferences, more amenable to receiving notifications, does not wish to receive notifications, or wishes to receive notifications only for work-related and/or important events. In some embodiments, a user can additionally or alternatively set designated non-working hours for which notification's preferences should be altered. In some embodiments, this preference does not apply to altering notification preferences for important events.

Figure 5:
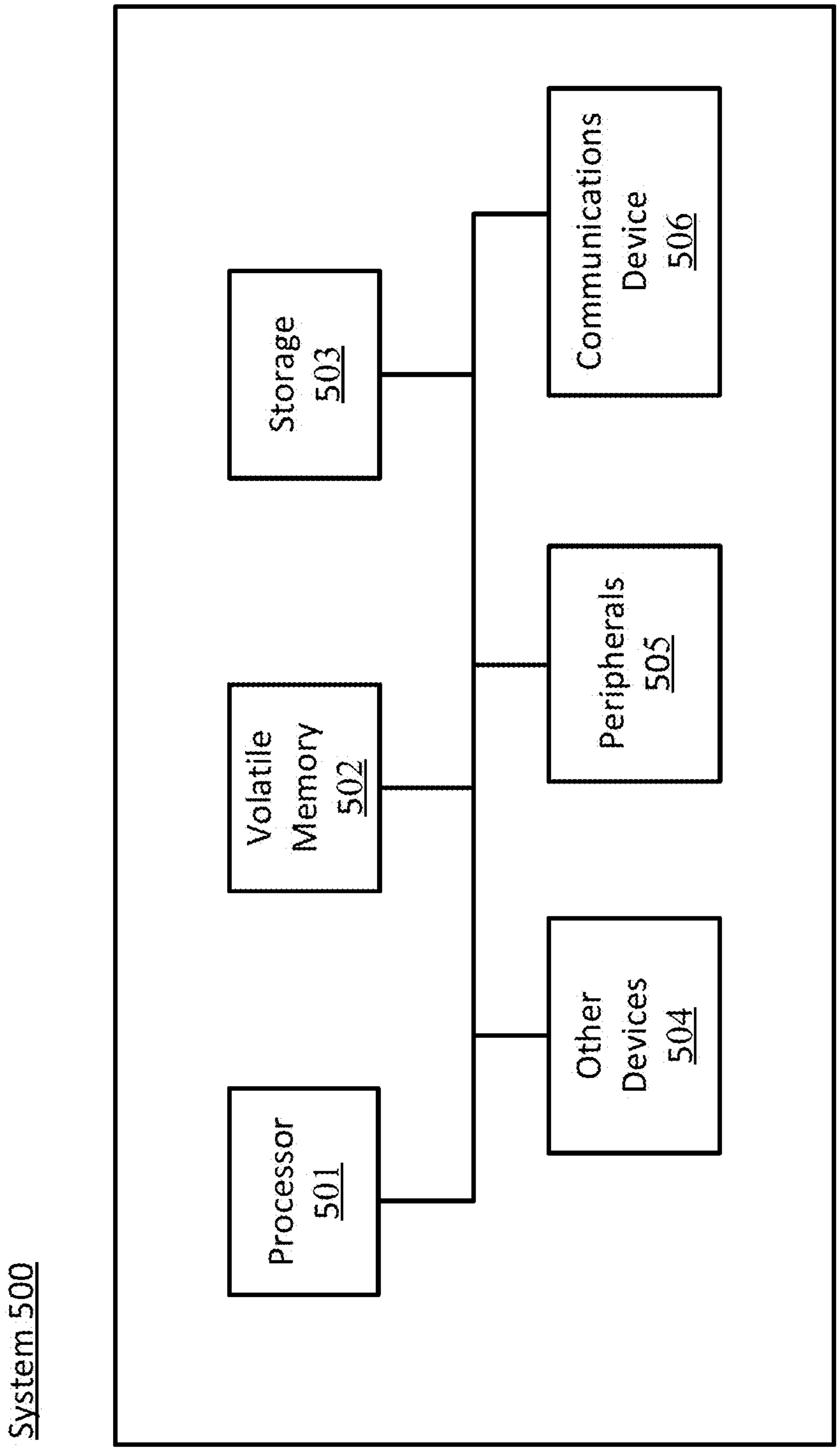
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information.

Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing notification of multitasking options during a communication session, comprising:

receiving, by a processor of a communication platform that provides remote video sessions between multiple participants, information associated with past events associated with a user of the communication platform;

receiving, by the processor, a user behavioral profile associated with the user stored in a memory of the communication platform, the user behavioral profile comprising a plurality of user behaviors associated with the past events;

receiving notification of a remote video session for the user;

analyzing, by the processor, the user behavioral profile with respect to the remote video session and the past events using an artificial intelligence (AI) model trained on one or more datasets comprising user behavioral profiles, wherein the AI model comprises a convolutional neural network (CNN) trained to classify user engagement and predict multitasking suitability based on first device telemetry data and historical behavioral data by:

receiving real-time activity measurements, historical user behavioral data, and event metadata, at a processing engine of the communication platform from a client device of the user, wherein the real-time activity measurements are obtained by the client device measuring client device activity of the user during the remote video session and comprise at least one of: a window-focus state of a remote video session client, an audio output state, a microphone mute state, a camera enablement state, a screen-sharing state, or a user input activity measured during the remote video session, wherein the processing engine is configured to send signals to and receive signals from the client device;

generating a user engagement score for the user by analyzing the real-time activity measurements and historical user behavioral data;

assigning, based on a comparison of the real-time activity measurements, historical user behavioral data, and event metadata, prediction classification scores for one or more multitasking activities associated with the user and the remote video session, wherein each of the one or more multitasking activities are tasks that have been determined as enabled for completion by the user during the remote video session based on the user engagement score of the user, wherein each prediction classification score is based on a likelihood that the user can perform the multitasking activity while attending an event and being engaged at the event according to an expected engagement;

providing, for display on the client device in a user interface element of the remote video session, notification of the one or more multitasking activities during the remote video session by the processing engine;

obtaining second device telemetry data from the client device during the remote video session;

updating the prediction classification scores in real-time based on the second device telemetry data during the remote video session, wherein updating the prediction classification scores in real-time comprises repeatedly updating the prediction classification scores at a plurality of time points during the remote video session based on changes in the second device telemetry data;

detecting, by the processor and using the AI model, a multitasking activity of the one or more multitasking activities being performed by the user during the remote video session, wherein the detecting comprises applying the CNN to the second device telemetry data to classify the multitasking activity; and updating the user behavioral profile based on the multitasking activity.

2. The method of claim 1, further comprising:

receiving a calendar associated with the user, wherein the calendar comprises the remote video session and the past events.

3. The method of claim 1, further comprising:

receiving or generating desired work hours for the user; and adding the desired work hours to the user behavioral profile to be included in analyzing the user behavioral profile.

4. The method of claim 1, wherein at least a subset of the user behaviors associated with past events relates to multitasking activities performed by the user during the past events.

5. The method of claim 1, wherein at least a subset of the user behaviors associated with past events relates to the user participating or not participating in the past events that were attended by the user.

6. The method of claim 1, further comprising:

receiving information from one or more integrated applications connected to the communication platform and associated with the user;

generating one or more user behaviors associated with the information from the integrated applications; and adding the generated user behaviors to the user behavioral profile.

7. The method of claim 1, wherein at least a subset of the user behaviors associated with past events relates to the user viewing one or more video feeds, listening to one or more audio feeds, reading textual messages, or a combination thereof.

8. The method of claim 1, further comprising:

obtaining one or more desired multitasking activities from the user; and obtaining a priority level for each of the desired multitasking activities, and wherein the desired multitasking activities are provided within the notification in descending order of priority level.

9. The method of claim 1, wherein at least a subset of the user behaviors associated with past events correspond to a number of events that the user has previously attended, and performed a multitasking activity, with one or more users.

10. The method of claim 1, further comprising:

assigning a priority level to the one or more multitasking activities, wherein the one or more multitasking activities are provided within the notification in descending order of priority level.

11. The method of claim 10, wherein at least one of the multitasking activities represents a completed activity which the user has completed within a predefined time window, and wherein the completed activity is assigned a lowest priority level.

12. The method of claim 1, wherein the notification is provided in a decision digest comprising one or more notifications for multitasking activities which can be performed during events.

13. The method of claim 1, further comprising:

providing, to an administrator or manager of the user within an organization, anonymized and aggregated data on the user and a plurality of other users within the organization with respect to multitasking activities performed by the users during remote video sessions, wherein the anonymized and aggregated data further comprises activity or engagement levels of the user and the plurality of other users during the remote video session while multitasking.

14. The method of claim 1, wherein at least one of the multitasking activities is a physical fitness activity to be performed by the user.

15. The method of claim 1, further comprising:

upon the user attending the remote video session, detecting one or more activities the user is engaged in via a user device connected to the communication platform to determine that at least one of the multitasking activities is being performed by the user during the remote video session; and using the determination for generation of future prediction classification scores.

16. The method of claim 1, wherein the notification comprises information on one or more multitasking activities the user is currently engaged in.

17. The method of claim 1, further comprising:

for each multitasking activity, receiving confirmation or denial from the user to add the multitasking activity to a list of multitasking activities for the user to be notified of for future remote video sessions; and using the confirmation or denial from the user for generation of future prediction classification scores.

18. A communication system comprising one or more processors configured to perform operations of:

receiving, by a processor of the communication system that provides remote video sessions between multiple participants, information associated with past events associated with a user of the communication system;

receiving, by the processor, a user behavioral profile associated with the user stored in a memory of the communication system, the user behavioral profile comprising a plurality of user behaviors associated with the past events;

receiving notification of a remote video session for the user;

analyzing the user behavioral profile with respect to the remote video session and the past events using an artificial intelligence (AI) model trained on one or more datasets comprising user behavioral profiles, wherein the AI model comprises a convolutional neural network (CNN) trained to classify user engagement and predict multitasking suitability based on first device telemetry data and historical data by:

receiving real-time activity measurements, historical user behavioral data, and event metadata, at a processing engine of the communication system from a client device of the user, wherein the real-time activity measurements are obtained by the client device measuring client device activity of the user during the remote video session and comprise at least one of: a window-focus state of a remote video session client, an audio output state, a microphone mute state, a camera enablement state, a screen-sharing state, or a user input activity measured during the remote video session, wherein the processing engine is configured to send signals to and receive signals from the client device;

generating a user engagement score for the user by analyzing the real-time activity measurements and historical user behavioral data;

assigning, based on a comparison of the real-time activity measurements, historical user profile data, and event metadata, prediction classification scores for one or more multitasking activities associated with the user and the remote video session, wherein each of the one or more multitasking activities are tasks that have been determined as enabled for completion by the user during the remote video session based on the user engagement score of the user, wherein each prediction classification score is based on a likelihood that the user can perform the multitasking activity while attending an event and being engaged at the event according to an expected engagement;

providing, for display on the client device in a user interface element of the remote video session, notification of the one or more multitasking activities during the remote video session by the processing engine;

obtaining second device telemetry data from the client device during the remote video session;

updating the prediction classification scores in real-time based on the second device telemetry data during the remote video session, wherein updating the prediction classification scores in real-time comprises repeatedly updating the prediction classification scores at a plurality of time points during the remote video session based on changes in the second device telemetry data;

detecting, using the AI model, a multitasking activity of the one or more multitasking activities being performed by the user during the remote video session, wherein the detecting comprises applying the CNN to the second device telemetry data to classify the multitasking activity; and updating the user behavioral profile based on the multitasking activity.

19. A non-transitory computer-readable medium containing instructions that when executed by a processor of a communication platform, cause the processor to perform operations comprising:

receiving, by the processor of the communication platform that provides remote video sessions between multiple participants, information associated with past events associated with a user of the communication platform;

receiving, by the processor, a user behavioral profile associated with the user stored in a memory of the communication platform, the user behavioral profile comprising a plurality of user behaviors associated with the past events;

receiving notification of a remote video session for the user;

analyzing, by the processor, the user behavioral profile with respect to the remote video session and the past events using an artificial intelligence (AI) model trained on one or more datasets comprising user behavioral profiles, wherein the AI model comprises a convolutional neural network (CNN) trained to classify user engagement and predict multitasking suitability based on first device telemetry data and historical behavioral data by:

receiving real-time activity measurements, historical user behavioral data, and event metadata, at a processing engine of the communication platform from a client device of the user, wherein the real-time activity measurements are obtained by the client device measuring client device activity of the user during the remote video session and comprise at least one of: a window-focus state of a remote video session client, an audio output state, a microphone mute state, a camera enablement state, a screen-sharing state, or a user input activity measured during the remote video session, wherein the processing engine is configured to send signals to and receive signals from the client device;

generating a user engagement score for the user by analyzing the real-time activity measurements and historical user behavioral data;

assigning, based on a comparison of the real-time activity measurements, historical user behavioral data, and event metadata, prediction classification scores for one or more multitasking activities associated with the user and the remote video session, wherein each of the one or more multitasking activities are tasks that have been determined as enabled for completion by the user during the remote video session based on the user engagement score of the user, wherein each prediction classification score is based on a likelihood that the user can perform the multitasking activity while attending an event and being engaged at the event according to an expected engagement;

providing, for display on the client device in a user interface element of the remote video session, notification of the one or more multitasking activities during the remote video session by the processing engine;

obtaining second device telemetry data from the client device during the remote video session;

updating the prediction classification scores in real-time based on the second device telemetry data during the remote video session, wherein updating the prediction classification scores in real-time comprises repeatedly updating the prediction classification scores at a plurality of time points during the remote video session based on changes in the second device telemetry data;

detecting, using the AI model, a multitasking activity of the one or more multitasking activities being performed by the user during the remote video session, wherein the detecting comprises applying the CNN to the second device telemetry data to classify the multitasking activity; and updating the user behavioral profile based on the multitasking activity.

20. The non-transitory computer-readable medium of claim 19, wherein the notification comprises information on one or more multitasking activities the user is currently engaged in.

* * * * *